United States Patent [19]

Kanamori

[11] Patent Number: 4,588,200

[45] Date of Patent: May 13, 1986

[54] BRAKING ARRANGEMENT FOR WHEELED VEHICLE

[75] Inventor: Takashi Kanamori, Hamamatsu, Japan

[73] Assignee: Yamaha Hatsudoki Kabushiki Kaisha, Japan

[21] Appl. No.: 638,043

[22] Filed: Aug. 6, 1984

[30] Foreign Application Priority Data

Aug. 4, 1983 [JP] Japan .................. 58-142812
Aug. 11, 1983 [JP] Japan .................. 58-145630

[51] Int. Cl.⁴ .................................. B62K 17/00
[52] U.S. Cl. ........................... 280/269; 74/502; 180/21; 188/204 R; 280/282
[58] Field of Search ............ 280/93, 267, 268, 269, 280/282; 188/204 R; 74/502; 180/215, 217, 219, 21, 237

[56] References Cited

U.S. PATENT DOCUMENTS

| | | | |
|---|---|---|---|
| 2,941,630 | 6/1960 | Anderson | 188/204 R |
| 3,120,294 | 2/1964 | Sherman | 188/204 R |
| 3,402,792 | 9/1968 | Masser | 188/204 R |
| 4,277,078 | 7/1981 | Root | 280/269 |
| 4,535,869 | 8/1985 | Tsutsumikoshi et al. | 180/311 |

Primary Examiner—John J. Love
Assistant Examiner—Kenneth R. Rice
Attorney, Agent, or Firm—Ernest A. Beutler

[57] ABSTRACT

A four wheel off the road vehicle having a pair of dirigibly supported front wheels each carrying a respective brake. The front wheels are steered by a centrally journaled steering shaft that carries a handlebar at its upper end with a brake actuator. A brake equalizing device is disposed adjacent the longitudinal center line of the vehicle adjacent the steering shaft and transmits braking forces from the brake actuator to the front wheel brakes.

3 Claims, 8 Drawing Figures

BRAKING ARRANGEMENT FOR WHEELED VEHICLE

BACKGROUND OF THE INVENTION

This invention relates to a braking apparatus for a wheeled vehicle and more particularly to an improved braking arrangement for the front wheels of a single rider off the road vehicle.

Recently, it has been proposed to provide an off the road vehicle of the type intended to be used by a single rider and having three balloon tires comprised of a dirigible front wheel and a pair of driven rear wheels. As an extension of this principle, it has been proposed to provide a somewhat similarly constructed off the road vehicle having four such balloon tires. Such four wheeled vehicles provide a pair of steered front wheels and a pair of driven rear wheels. Again, however, the vehicle is intended to be used by only a single rider. The addition of the second steered front wheel gives rise to further stability.

However, it is desirable to provide an arrangement wherein all four wheels of such off the road vehicles may be braked. The steering is normally by means of a handlebar and steering shaft that runs through the longitudinal center line of the vehicle. If the brake is operated by a hand operated lever, it is desirable to insure that both front wheels are braked equally.

It is, therefore, a principal object of this invention to provide an improved braking system for the front wheels of an off the road, single rider vehicle.

It is another object of this invention to provide a braking system for the front wheels of a vehicle having its steering shaft located on the longitudinal center line of the vehicle.

SUMMARY OF THE INVENTION

This invention is adapted to be embodied in an off the road vehicle of the type having a frame, a pair of driven rear wheels mounted at one of the frame and a pair of dirigible front wheels mounted at the other end of the frame. The front wheels are steered by means of a steering shaft that is disposed on the longitudinal center line of the vehicle. In accordance with this feature of the invention, a front brake is provided for each of the front wheels and a brake operator is provided in proximity to the steering shaft for operating the front brakes. A brake equalizing device is positioned on the longitudinal center line of the vehicle for transmitting braking forces from the operator control to the individual front brakes.

DETAILED DESCRIPTION OF THE PREFERRED EMBODIMENT

Figure 1:
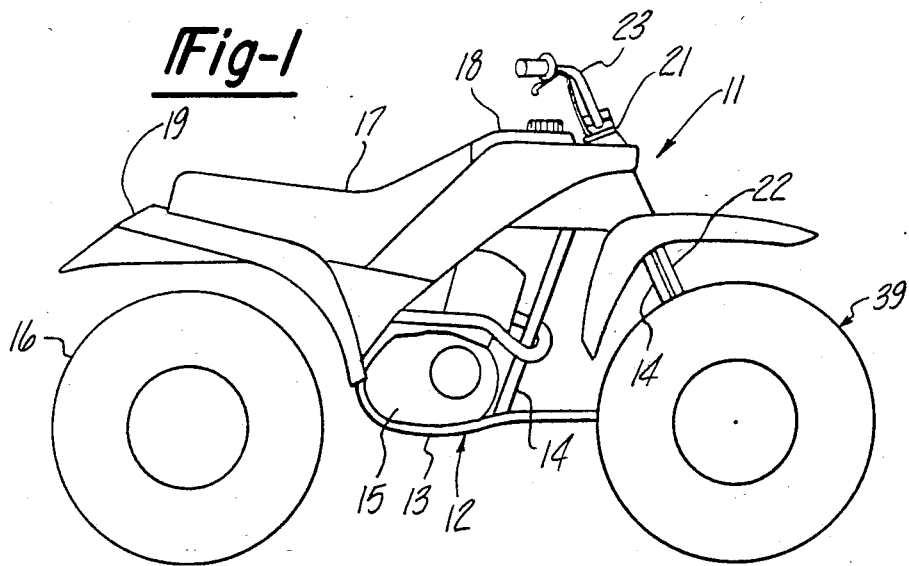
FIG. 1 is a side elevational view of an off the road, four wheeled vehicle constructed in accordance with an embodiment of the invention.
Figure 4:
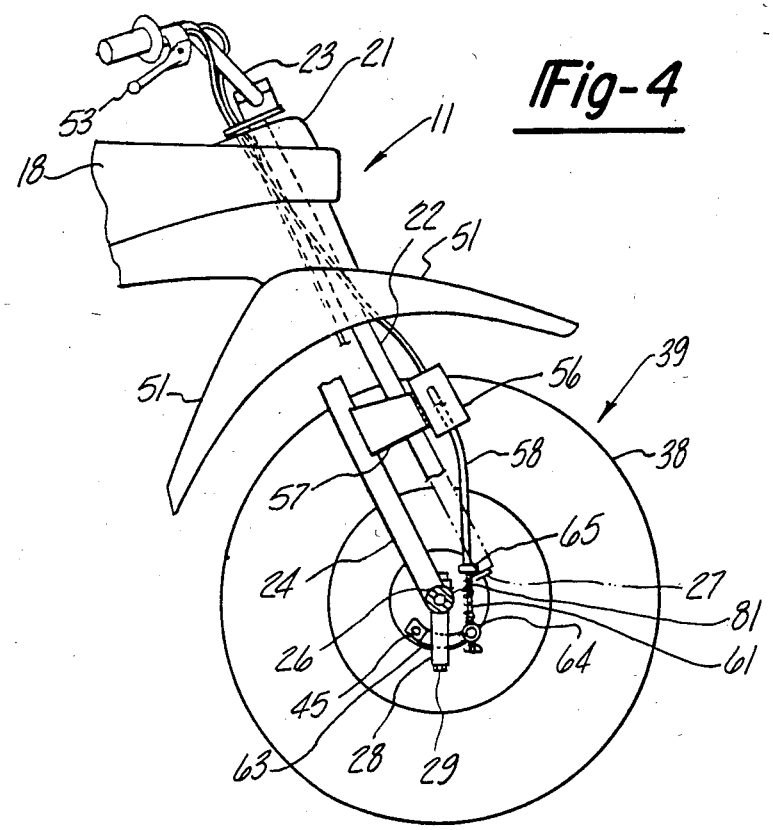
FIG. 4 is a side elevational view of the forward portion of the vehicle with portions broken away.
Figure 2:
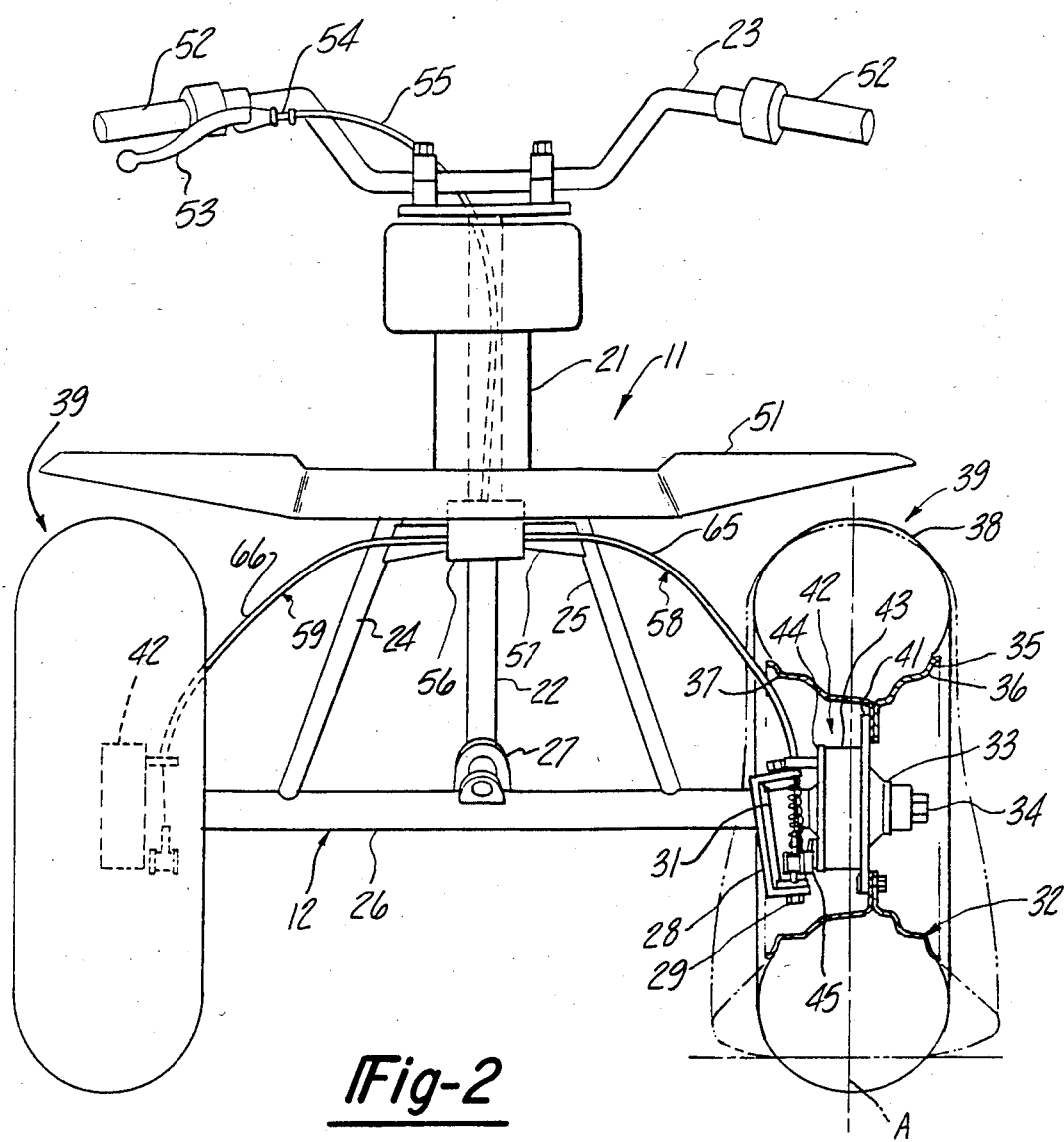
FIG. 2 is a front plan view, on an enlarged scale, of the vehicle with a portion shown in section.
Figure 3:
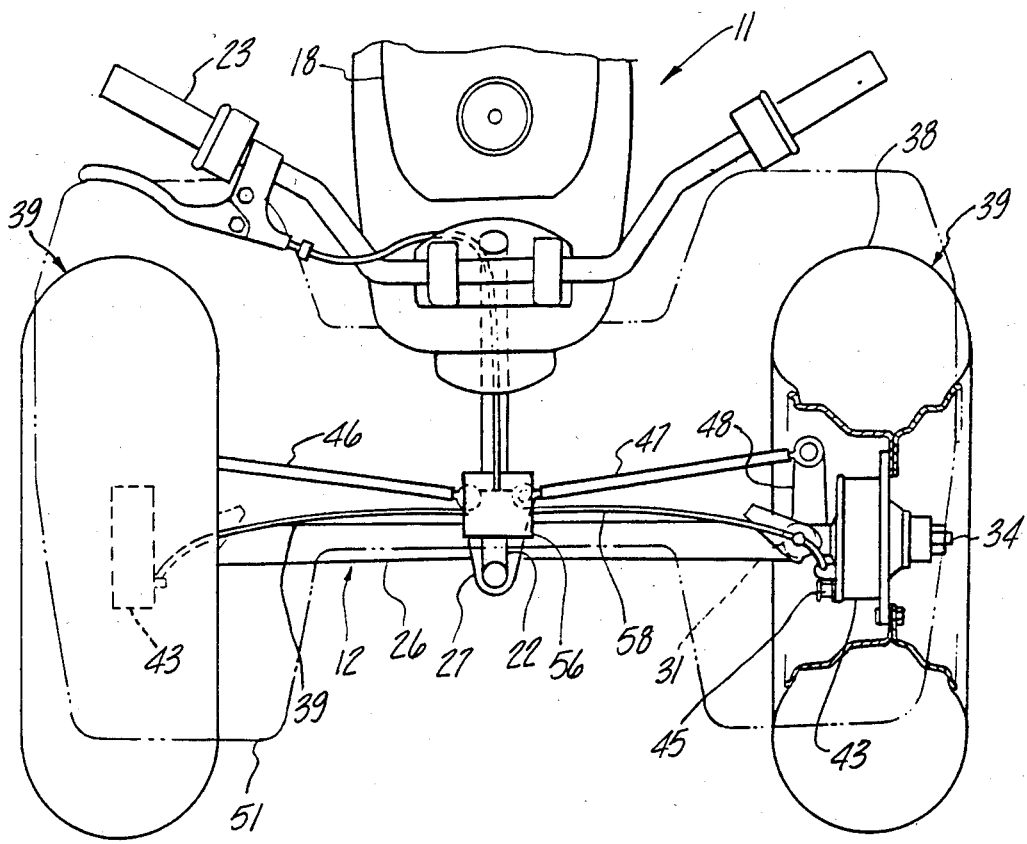
FIG. 3 is a top plan view of the front portion of the vehicle, with a portion shown in section and other portions shown in phantom.

An off the road vehicle constructed in accordance with an embodiment of this invention is identified generally by the reference numeral 11. The vehicle 11 includes a frame assembly, indicated generally by the reference numeral 12, which may be of any known construction and which is preferably made up of a welded tubular assembly. The assembly 12 includes a pair of lower tubes 13 and a pair of upwardly extending tubes 14 that support a power plant 15 in a suitable manner. the power plant 15 includes an internal combustion engine and change speed transmission that drive a pair of rear wheels on which balloon tires 16 are mounted. The manner of driving the rear wheels and balloon tires 16 and their suspension system, if any is desired, may take any known form and for that reason have not been illustrated nor will they be described in detail.

A seat 17 is mounted on the frame assembly 12 and is primarily adapted to accommodate a single rider. A fuel tank 18 is positioned forwardly of the seat 17 and supplies fuel in a known manner to the power plant 15. In addition, a body 19, which may be formed integrally with or separately from the seat 17, is accommodated on the frame assembly 12 and includes fenders that overlie the rear wheels 16.

At its forward end, the frame assembly 12 includes a head tube assembly 21 that rotatably journals the upper end of a steering shaft 22 in an appropriate manner, A handbar assembly 23 is affixed to the upper end of the steering shaft 22 so as to permit its steering rotation in a suitable manner as is well known in this art.

The frame assembly 12 includes a pair of forward, generally vertically extending members 24 and 25 that are connected at their upper end to the head tube assembly 21 in an appropriate manner. The lower ends of the tubes 24 and 25 carry a cross tube 26 which supports a forwardly extending bracket 27 that journals the lower end of the steering shaft 22.

Brackets 28 are affixed to the opposite ends of the tube 26 and carry a respective king pin 29. The king pin 29, in turn, journals a spindle assembly 31 for steering movement about the axis defined by the king pins 29. A front wheel 32 is bolted to a hub portion 33 that is, in turn, journaled for rotation on the spindle 31 and is held in place by a nut 34 in a known manner. The wheel 32 has a rim 35 that is provided with axially offset bead seats 36 and 37 that mount a respective balloon tire 38 to form the front wheel assemblies, indicated generally by the reference numeral 39.

The center of the wheel assemblies 39 is defined by the line A which, as will be noted from the cross-sectional view in FIG. 1, is offset from the hub center 33 of the wheel 32 and specifically from a plate 41 that connects the hub center 33 with the rim 36.

Contained within the offset portion of the wheel assembly 39 is a drum brake assembly, indicated generally by the reference numeral 42. The drum brake assembly 42 includes a drum 43 that is supported for rotation with the wheel assembly 39 and a backing plate 44 that is fixed against rotation relative to the spindle 31 but which is steerable with it about the king pin 29. The drum brake assembly 42 is of the internal shoe expanding type and is mechanically actuated by a cam member 45 that is supported for rotation about the backing plate 44 at a generally lowermost axis. The manner for actuating the brakes 42 will be described below.

The steering shaft 22 is connected to a pair of tie rods 46 and 47 which are, in turn, connected to respective links 48 that are affixed to the spindles 31 for steering the front wheels 39. The steering shaft 22 is located on the longitudinal center line of the vehicle, particularly since it is intended to be operated by a single rider on the seat 17.

A front fender assembly 51 is carried by the frame 12 or may form a portion of the body 19 and overlies the front wheels 39.

The manner for operating the brakes 42 will now be described. Adjacent one end of the handlebar assembly 23 and specifically adjacent one of the hand grips 52, an actuating lever 53 is supported for pivotal movement. The actuating lever 53 is intended to be operated by the rider and is connected to a wire 54 that is slidably supported within a protective sheath 55 which is, in turn, fixed relative to the handlebar assembly 23. The wire actuator operates an equalizer device 56 that is mounted on a cross member 57 of the frame assembly and which cross member is specifically affixed to the upper ends of the frame tubes 24 and 25. The equalizer device 56 is shown in most detail in FIGS. 5 through 8 and operates a pair of wire actuators 58 and 59 that extend to the respective front wheels 39. Each of the wires 58 and 59 is comprised of a respective wire element, 61 or 62, the lower end of which is affixed to one end of a lever 63 that is affixed to the cam 45 by means of a suitable fastener 64. In addition, each of the wire actuators 58 and 59 includes a respective protective sheath 65 and 66, the lower end of which is affixed relative to the backing plate 44 in an appropriate manner.

Referring now primarily to FIGS. 5 through 8, the equalizing device 56 includes a first lever 71 that is journaled on the frame member 57 intermediate the ends of the lever 71 by means of a pivot pin 72. One end of the lever 71 is affixed to the protective sheath 55 of the operator controlled actuator by means of a connector 73. The opposite end of the lever 71 is connected by means of a fastener 74 to the one end of the protective sheath 66 of the wire actuator 59 associated with one of the front wheel brakes.

Figure 5:
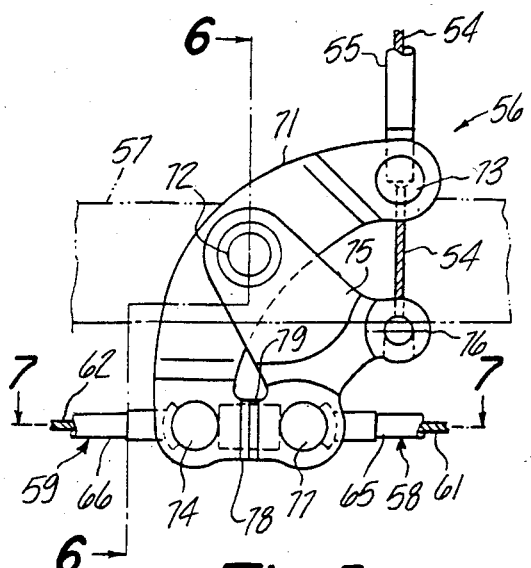
FIG. 5 is an enlarged front elevational view of the equalizing device for actuating the front wheel brakes.
Figure 6:
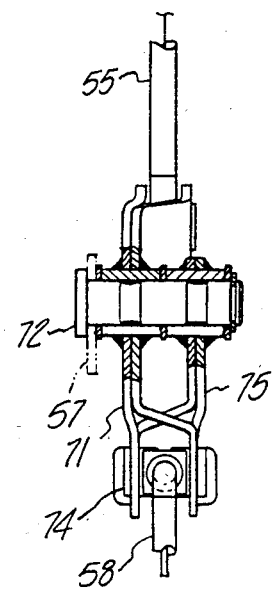
FIG. 6 is a cross-sectional view taken along the line 6—6 of FIG. 5.
Figure 7:
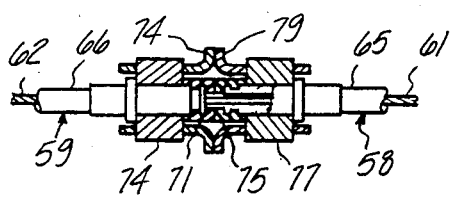
FIG. 7 is a cross-sectional view taken along the line 7—7 of FIG. 6.

The lower end of the operator controlled wire 54 is connected to one arm of a bellcrank 75 by means of a fastener 76. The bellcrank 75 is connected intermediate its ends to the pivot pin 72 for pivotal movement about the same axis. The remaining arm of the bellcrank 75 is connected by means of a fastener 77 to one end of the protective sheath 65 of the wire actuator 58. The end of the lever 71 carrying the fastener 74 and the arm of the bellcrank 75 carrying the fastener 77 are formed with respective abutting flanges 78 and 79 that are adapted to engage each other when the brakes are in their released condition as shown in FIG. 5.

Figure 8:
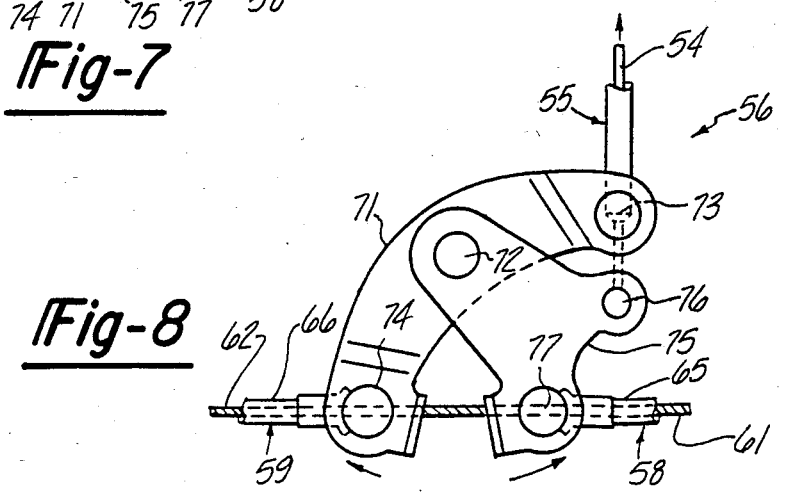
FIG. 8 is a front elevational view, in part similar to FIG. 5, showing the brakes in their actuated condition.

To operate the front wheel brakes 42, the operator squeezes the hand grip 53 so as to place a tensile force on the wire 54 and a compressive force on its protective sheath 55. These forces tend to cause the lever 71 and bellcrank 75 to rotate relative to each other about the pivot pin 72 as shown in FIG. 8 so as to cause the fasteners 74 and 77 to be forced apart and exert a tensile force on the respective wire actuators 61 and 62. This force causes the levers 63 to be rotated and rotate the cams 45 so as to engage the brake shoes of the respective front brake assemblies 42. Release springs 81 encircle the lower ends of the wire actuators so as to release the brakes when the pressure on the actuating handle 53 is released. In this manner, the brakes associated with the front wheels 39 will be operated simultaneously and equally so as to insure good stopping.

It should be readily apparent from the foregoing description that the described construction facilitates actuation of the brakes of the front wheels and is balanced about the centralized steering axis 22 because of the equalizer device 56. Although an embodiment of the invention has been illustrated and described, particularly when applied to a mechanically operated drum type brake, various changes and modifications may be made, without departing from the spirit and scope of the invention, as defined by the appended claims.

I claim:

1. A wheeled vehicle having a frame means, a pair of driven wheels rotatably journaled at one end of said frame means, a pair of dirigible front wheels supported for steering movement at the other end of said frame means, a steering shaft for steering said front wheels and journaled on the longitudinal center line of said vehicle, a mechanical brake actuator juxtaposed to said steering shaft, a bowden cable actuator having a wire actuated by said brake actuator and a surrounding protective sheath, a linkage system brake equalizing device mechanically actuated by said brake actuator and disposed on the longitudinal center line of said vehicle, and means for actuating front brake assemblies associated with said front wheels from said equalizing device, said linkage system comprising a first lever pivotally supported intermediate its ends on said frame and having one end thereof adapted to actuate the brake associated with one of the front wheels, a second lever pivotally supported relative to said first lever about said pivot axis, means for pivotally connecting one end of said second lever to the other of said front wheel brakes for actuating said other front wheel brake and means for pivotally connecting the other end of one of said levers to said wire and the other end of the other of said levers to said protective sheath for pivoting said levers in an opposite direction upon operation of said mechanical actuator.

2. A wheeled vehicle as set forth in claim 1 wherein the equalizing device is supported at the front end of the steering shaft by the frame means.

3. A wheeled vehicle as set forth in claim 1 wherein a handlebar is affixed to the upper end of the steering shaft and the brake actuator is carried at one end of the handlebar.

* * * * *